Feb. 28, 1928.
E. C. WILSON
AUTOMATIC PIPE TONGS
Filed Oct. 29, 1924
1,660,853
2 Sheets-Sheet 1
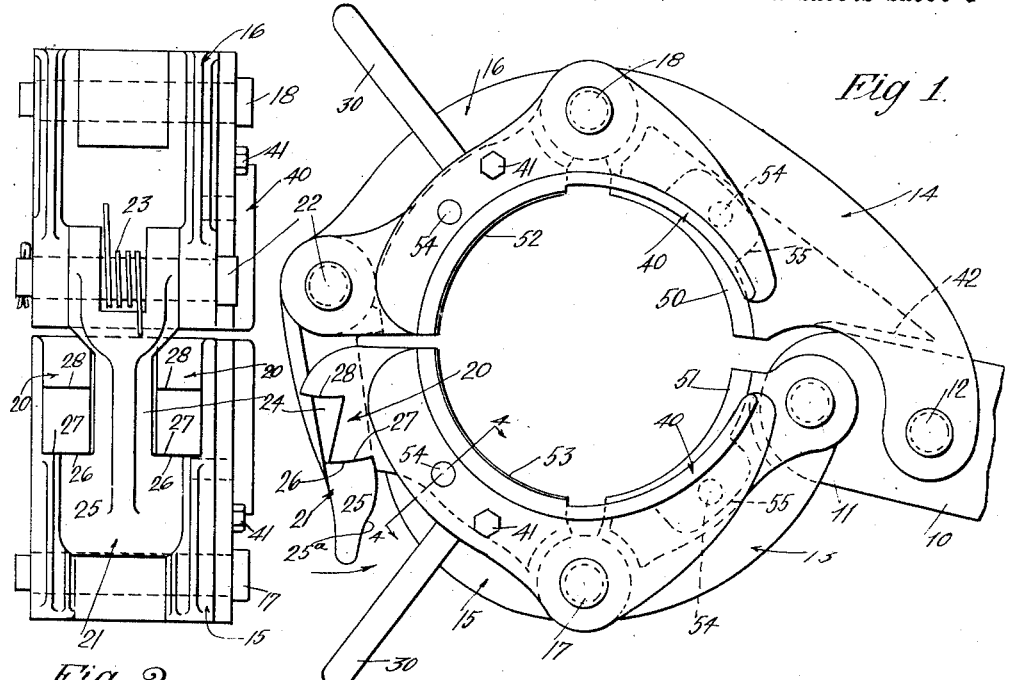
Fig. 1.
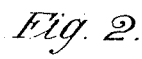
Fig. 2.
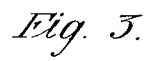
Fig. 3.
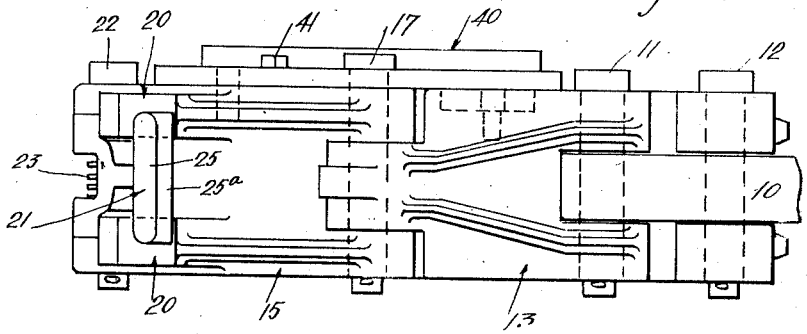
Fig. 4.
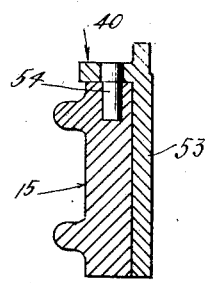
Inventor.
Elihu. C. Wilson.
Attorney.

Feb. 28, 1928.

E. C. WILSON 1,660,853

AUTOMATIC PIPE TONGS

Filed Oct. 29, 1924   2 Sheets-Sheet 2

Inventor.
Elihu C. Wilson.
Attorney.

Patented Feb. 28, 1928.

1,660,853

UNITED STATES PATENT OFFICE.

ELIHU C. WILSON, OF LOS ANGELES, CALIFORNIA.

AUTOMATIC PIPE TONGS.

Application filed October 29, 1924. Serial No. 746,688.

This invention relates to pipe tongs such as are, for instance, used upon well pipe and rotary drill pipe and the like; and the general object of the invention is to provide a tongs that will automatically operate to take and close about different sizes of pipe or a pipe and its collar, without the necessity of substituting one tongs for the other, or without the necessity of any change manually to be made in the tongs.

By way of illustrating the present invention, I show in the accompanying drawings the adaptation of my present invention to a tongs of the general type that forms the subject matter of my prior application on pipe tongs, filed September 12, 1921, Serial No. 500,177, now issued as Patent No. 1,561,963, Nov. 17, 1926; but it will be understood that I give this specific illustration and adaptation only as illustrative of my invention, and it will be readily understood that the present invention may be applied to various types of tongs, and embody various types of latches and self-closing devices. However, considering the invention in some of its more specific aspects, there are certain features of the invention residing in combination with the type of tongs herein described; and all of this will be best understood from the following description, and a consideration of the appended claims.

This application forms a continuation in part of my prior applications on pipe tongs, Serial No. 592,439, filed October 4, 1922 now issued as Patent No.1,575,141, March 2, 1926; and the distinction between this present application and said prior application lies in the adoption for this present application of all the claims having to do with a combination of a self closing device and a multiple step latch, whereby the tongs are wholly or in part automatically self closed about a pipe of any given diameter, and are automatically latched by selective action of the latching mechanism in proper position to encircle and take that particular diameter of work.

Referring now to the drawings:

Fig. 1 is a plan of such a tongs equipped with my invention, the handle of the tongs being broken away for purposes of illustration;

Fig. 2 is an end elevation of the same;

Fig. 3 is a side elevation of the same;

Fig. 4 is a detail section taken as indicated at line 4—4 on Fig. 1;

Figure 5:
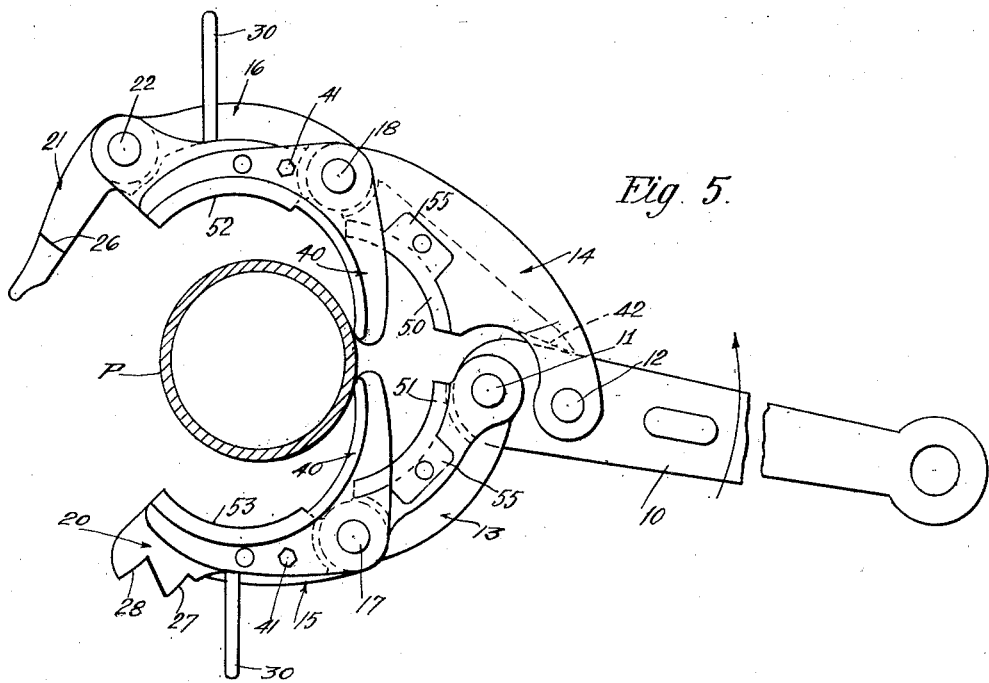
Fig. 5 is a plan showing the tongs in the act of being applied to and closing about a smaller sized pipe.

In the drawings, the tongs are shown with a handle 10 to which are pivoted, at 11 and 12 respectively, two of the pipe encircling segments or jaws 13 and 14, which may be referred to as inner jaws. The two pivots 11 and 12 are off set in such a manner that movement of the handle will constrict the pipe encircling segments or jaws about the pipe, as will be well understood. The details of construction of the pipe encircling segments need not here be gone into. These segments are arranged in two series, the segments of each series being pivotally interconnected with each other; in these drawings I show each series made up of two segments. Thus, two outer pipe encircling segments or jaws 15 and 16 are pivoted at 17 and 18 respectively, to the two segments 13 and 14; and the four segments together will encircle a pipe. The outer end of segment 15 is provided with latch lugs 20, here shown as two in number and spaced apart as indicated in Figs. 2 and 3. The end of segment 16 is provided with a pivoted latch 21 mounted on a pivot pin 22 and spring pressed, as by a spring 23, in the direction indicated by the arrow in Fig. 1, so that the pivoted latch is at all times pressed inwardly towards the lug 20. In the particular form of latch herein illustrated, the latch has a relatively narrow shank 24 that extends between spaced lugs 20 and has a relatively wide head 25 having shoulders 26 thereon adapted to engage with either shoulders 27 or shoulders 28 of lugs 20. Each of the lugs 20 has two such spaced shoulders 27 and 28, as the tongs here illustrated have been designed to take automatically either of two different pipe sizes or a pipe and its collars. It will be readily understood, however, that this particular construction and arrangement of the lugs is not essential to the broader aspects of my invention, as the latch and its arrangement relative to the latching lugs may be varied. For instance, instead of the latch extending between two latching lugs, it can be made to operate on one latching lug, although a symmetrical arrangement with reference to the central longitudinal axis of the latch is more desirable; or the latch may be made in the shape of a clevis or loop to extend around a single latching lug having the multiple shoulders thereon.

It will be noted that the two latching shoulders 27 and 28 on lugs 20 are circumferentially spaced from each other in such a manner that when latch shoulder 26 engages shoulders 27 the casing encircling structure is closed down to its minimum diameter to take a smaller sized pipe; while with latch shoulders 26 in engagement with shoulders 28 the structure is at its maximum diameter to take a larger sized pipe or a pipe collar. The exact location and the relative spacings of shoulders 27 and 28, and the number of spaced shoulders may be chosen to adapt the tongs to any desired sizes. For instance, in the case where the arrangements and dimensions are to make the tongs applicable either to a pipe or the collar of that pipe, the tongs may be easily applied either to the pipe or the collar, without any necessity on the part of the operator selecting the shoulder (27 or 28) with which the latch is going to engage. Handles 30 are mounted on segments 15 and 16 and with these handles, or with the aid of such an automatic closing device as I will now describe, the segments or jaws may be closed around the pipe or its collar, and the inner surface 25ᵃ of latch head 25 will ride up over the lugs, and latch shoulder 26 will drop behind shoulders 27 or shoulders 28, selectively, depending upon the diameter of the work about which the tongs are being closed.

The self closing device shown in the drawings is of the nature shown in the co-pending application of Deakins and Hamer, Serial No. 595,693, filed October 19, 1922, entitled "Self-closing pipe tongs," and shown also in the application of Charles E. Wilcox, Serial No. 551,252, filed April 10, 1922, now issued as Patent No. 1,627,260, May 3, 1927, entitled "Pipe tongs;" both of which applications have been assigned to the present applicant. In such a form of self-closing device, it may be either entirely automatic in its action or semi-automatic in its action, as I will hereinafter point out, and there may be mounted on one or both the outer segments 15 and 16 a projecting member 40 that is thrown out into the segement enclosed space when the tongs are opened up, as shown in Fig. 5. In the specific form herein illustrated, these members 40 are in the form of segmental plates fitting down over pivot pins 17 and 18, and are secured to segments 15 and 16, for instance, by cap screws 41. Thus, these members 40 move at all times with the outer segments 15 and 16, and their inner ends are thrown into the segment enclosed space when the outer segments are opened up by being swung around on their pivotal connection 17 and 18 with relation to the two inner segments 13 and 14. The outer segments swing freely at their pivots 17 and 18, and in opening the tongs either by merely pulling it off the pipe after the latch has been released, or by manual application to handles 30, the outer segments will first be swung outwardly on their pivotal centers, and then the inner segments may be somewhat swung outwardly. Normally, and because there is more friction at the pivots 11 and 12 than at pivots 17 and 18, due to the greater weight hanging upon pivots 11 and 12, the opening movement of the tongs will take place primarily at pivots 17 and 18; but if it is necessary, stops may be used to limit the opening movement of the inner segments, or one of the inner segments, as for instance as is illustrated at 42 in Fig. 1.

With the parts in the position as shown in Fig. 5, it is only necessary to move the tongs endwise onto the pipe P when the ends of closing members 40 come into contact with the pipe, and then further movement af the tongs to the left in Fig. 5 causes the outer segments 15 and 16 to move inwardly upon the pipe; and this inward swinging movement is communicated to the inner segments 13 and 14, and causes them also to close down upon the pipe. As the segments close, the latch 21 rides up over lugs 20, and latch shoulder 26 drops over shoulder 28, and if the pipe is a smaller one, the latch goes on until shoulder 26 drops over shoulder 27. The segments are then properly locked about the pipe; and it will be seen that the entire action has been completely automatic. To release the tongs it is only necessary to release latch 21 and pull the tongs off the pipe.

Figure 6:
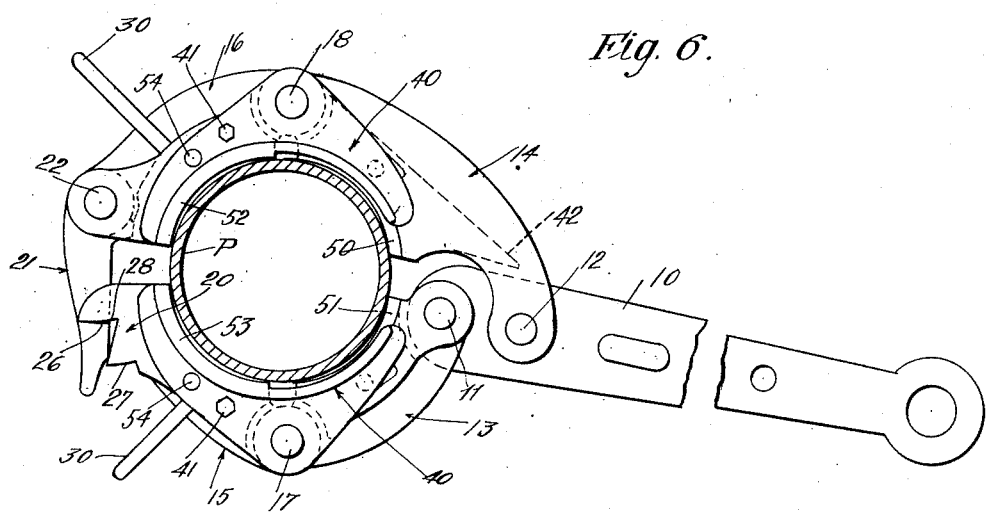
Fig. 6 is a plan showing the tongs closed about a larger sized pipe or, for instance, the collar of the pipe shown in Fig. 5.

In the form of latch herein described, shoulders 27 and 28, and also latch shoulder 26 are all preferably curved and concentric with latch pivot 22, so that the latch shoulder drops down easily over the lug shoulders and obtains a good flat bearing thereon; and also so that the longitudinal strain imposed upon the latch has no tendency whatever to make the latch work out or slip out on shoulders 27 and 28. This arrangement is fully described in my said prior application, and is preferably carried out in this multiple sized automatic tongs. The lug shoulder 27 and 28 may either be concentric with pivot 22 when the tongs are in position closed about a smaller pipe, in the position shown in Fig. 1; or they may be concentric in a position intermediate the two positions of Fig. 1 and Fig. 6. However, it may be preferred to make them concentric when in the smaller position of Fig. 1, as then, if anything, the slight lack of concentricity of the shoulders as in the position of Fig. 6 will tend to make the latch work inwardly upon the shoulders rather than outwardly.

Now, the function of members 40 when applied as shown in the drawings to both sides of the tongs, is to make the tongs entirely and fully automatic in its action as hereinbefore described. However, one of the members 40 may be omitted, and the tongs will yet be at least semi-automatic in its closing; or it may be said to be fully automatic, only requiring of the operator an additional hand operation that is carried out simultaneously with the movement of swinging the tongs on to the pipe. These tongs are usually very heavy, and are usually suspended in horizontal or substantially horizontal position on a crane or other overhead support, so that the operator may with one hand on handle 10 move the tongs against the pipe by movement toward the left in Fig. 5. If now, for instance, the closing member 40 on segment 15 be omitted, the other member 40 on segment 16 will close segments 14 and 16 around and hold them against the pipe as the tongs are swung on to the pipe. The operator will then, simultaneously with said movement of the tongs on to the pipe, grasp handle 30 of segment 15 with his other hand, and swing it about the pipe at the same time that segment 16 is automatically swung about the pipe. Although these operations are usually carried out simultaneously by the operator, it is, of course, evident that exact simultaneity of closure of segments 15 and 16 is not necessary to the final automatic action of the latch. The operator may swing the tongs thus equipped on to the pipe, and the single member 40 then operates to hold segments 14 and 16 about the pipe, the handle 10 being in such an operation swung around by the operator in the direction indicated by the arrow in Fig. 5 until the handle comes against stop 42 to hold segment 14 from backing away from the pipe. Then the operator can subsequently close segments 15 and 13 about the pipe and automatic selective latching takes place.

The present invention also provides in combination with the mechanism above described a convenient means whereby the sizes of work taken by the tongs may be changed. For instance, in the drawings, I show the tongs equipped with four bushings, two of which, 50 and 51, are mounted on inner segments or jaws 14, and the other two, 52 and 53, mounted on the outer segments or jaws 15 and 16 by being carried on the members 40. The upper edge of each segment or jaw may have a pin or the like, as shown at 54; and the two bushings 50 and 51 may have lugs 55 with holes that drop over these pins. The self-closing members 40 may also have holes that drop over the other pins 54, and bushings 52 and 53 may be carried by members 40, as illustrated, as those members 40 are always in fixed relation to segments 15 and 16. Thus the bushings are conveniently divided into four parts so as to keep the advantages of a four jawed tong. When the bushings are removed, as can easily be done, the tongs will, of course, then automatically and selectively take two larger sizes of pipe than is illustrated in the drawings, or a larger sized pipe and its collar. When the bushings are not used, the self closing members 40 that are put onto the tongs in lieu of members carrying bushings, are plain curved plates, as will be readily understood. It will be understood that bushings of various thickness may be applied so as to adapt any given tongs, within reasonable limits, to any sizes of pipes.

Another feature that I may call attention to is this: that the amount of back off of the encircling jaws (the amount of looseness of the jaws about the pipe) when handle 10 is moved in the back off direction indicated by the arrow in Fig. 5, is not sufficient to allow latch shoulder 26 to go on and drop over lug shoulder 27 when the tongs are closing about a larger diameter of work, and the latch should engage with the shoulder 28. The relation of pivots 11 and 12 is such that in the normal amount of backing off movement given handle 10 by an operator when he is putting the tongs upon the pipe, will not develop a sufficient looseness to allow the latch to ride over and catch upon the wrong shoulder. And stop shoulder 42 on segment 14 has the same effect, preventing excessive movement of handle 10 in a back off direction, and stopping such movement of the handle before the segments have been so expanded that the latch could move around too far and catch upon the wrong shoulder. In other words, the amount of circumferential looseness of the jaws about the pipe, with the handle backed off to its extreme limit, is less than the circumferential distance between the two latching shoulders 27 and 28. It will be understood, of course, that in applying the tongs to a pipe it is necessary that the handle be backed off as the tongs moves upon the pipe in order that the segments may close down around the pipe far enough to insure latch shoulder 26 dropping over and catching upon the proper lug shoulder.

From the foregoing illustrative description, my invention will be readily understood. It will be understood that various changes and modifications may be made other than those mention herein, and that accordingly, I do not wish to limit the invention to the specific things herein described except as the invention is so specifically limited in the following claims.

Having described a preferred form of my invention, I claim:

1. In a pipe tongs adapted to take work of different diameters, the combination of a plurality of pipe encircling segments, means actuated by contact with a pipe to positively move the segments to closed position upon the pipe, and means acting automatically on closure of the segments to latch them selectively in one of a plurality of pipe encircling positions.

2. In a pipe tongs adapted to take work of different diameters, the combination of a plurality of pipe encircling segments, means actuated by contact with a pipe to positively move the segments to closed position upon the pipe, and a spring actuated latch device having a plurality of latching steps and adapted to latch the segments around the pipe selectively in one of a plurality of pipe encircling positions.

3. In a pipe tongs adapted to take work of different diameters, the combination of a plurality of relatively movable parts adapted to encircle a pipe, means to positively move one of said parts to closed position on the pipe by virtue of the placement of the tongs on the pipe, and means acting automatically on closure of said part onto the pipe to latch it selectively in position to engage pipe of different diameters.

4. In a pipe tongs adapted to take work of different diameters, the combination of a plurality of relatively movable parts adapted to encircle a pipe, means to positively move one of said parts to closed position on the pipe by virtue of placement of the tongs on the pipe, and a spring actuated latch device having a plurality of latching steps and adapted to latch said parts selectively in position to engage pipe of different diameters.

5. In a pipe tongs adapted to take work of different diameters, the combination of an operating handle, inner opposed gripping jaws operatively connected to the handle, outer opposed gripping jaws pivotally connected to the inner jaws, said outer jaws being movable on their pivotal centers to open and close the tongs whereby the work may be inserted in and removed from the tongs, means movable into the bore of the tongs by an opening movement of an outer jaw, and adapted to be engaged by the work to close said jaw upon insertion of the work into the tongs, and means for selectively locking the outer jaws in a plurality of relative positions to hold the jaws about pipes of different diameters.

6. In a pipe tongs adapted to take work of different diameters, the combination of an operating handle, inner opposed gripping jaws operatively connected to the handle, outer opposed gripping jaws pivotally connected to the inner jaws, said outer jaws being movable on their pivotal centers to open and close the tongs whereby the work may be inserted in and removed from the tongs, means movable into the bore of the tongs by an opening movement of both the outer jaws, and adapted to be engaged by the work to close said jaws upon insertion of the work into the tongs, and automatic latching means for selectively locking the outer jaws in a plurality of relative positions to hold the jaws about pipe of different diameters, said means embodying a spring pressed latch carried by one outer jaw and a lug member on the other outer jaw, one of said members having a plurality of spaced latch shoulders.

7. A pipe tongs adapted to take work of different diameters, comprising a handle and two series of pivotally interconnected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the tongs are open, and adapted to be engaged and moved by the pipe to close that segment and with it another pivotally connected segment, onto the pipe, and means for selectively locking the outer jaws in a plurality of relative positions to hold the jaws about pipes of different diameters.

8. A pipe tongs adapted to take work of different diameters, comprising a handle and two series of pivotally interconnected segments adapted together to encircle a pipe, one segment of each series being pivoted to the handle and the other segments of each series being pivoted to and pivotally supported on the handle pivoted segment of that series, and a projecting member connected to one of the last mentioned segments of each series, projecting into the segment enclosed space when the two tongs are open, and adaped to be engaged and moved by the pipe to close that segment and with it another pivotally connected segment, onto the pipe, and automatic latching means for selectively locking the outer jaws in a plurality of relative positions to hold the jaws about pipe of different diameters, said means embodying a spring pressed latch member carried by one outer jaw and a lug member on the other outer jaw, one of said members having a plurality of spaced latch shoulders.

9. A pipe tongs adapted to take work of different diameters, comprising an inner jaw shaped to fit a pipe and having an arcuate work engaging face, a handle to which said inner jaw is attached, means operating in conjunction with the handle for gripping the pipe, a work engaging outer jaw pivoted on said inner jaw having a pipe engaging arcuate face extending outwardly from its pivot point, an automatic closing finger swung into the path of the pipe when the outer jaw is opened for swinging the outer jaw into contact with the pipe when the inner jaw is moved towards the pipe, whereby the outer jaw causes the arcuate face of the inner jaw to engage the pipe, and means engaging the outer jaw and latching it selectively in a plurality of positions to encircle pipes of different diameters.

10. A pipe tongs adapted to take work of different diameters, comprising an inner jaw shaped to fit a pipe and having an arcuate work engaging face, a handle to which said inner jaw is attached, means operating in conjunction with the handle for gripping the pipe, a work engaging outer jaw pivoted on said inner jaw having a pipe engaging arcuate face extending outwardly from its pivot point, an automatic closing finger swung into the path of the pipe when the outer jaw is opened for swinging the outer jaw into contact with the pipe when the inner jaw is moved towards the pipe, whereby the outer jaw causes the arcuate face of the inner jaw to engage the pipe, and automatic latching means engaging the outer jaw and selectively latching the outer jaw in a plurality of relative positions to hold the jaws about pipes of different diameters, said means embodying a spring pressed latch member and a lug member, one of said members having a plurality of spaced latch shoulders.

11. In a pipe tongs adapted to take work of different diameters, the combination of a plurality of relatively movable pipe encircling segments, means acting by virtue of contact with the pipe to hold one of the segments up to a pipe, and means acting automatically on closure of the segments about the pipe to latch another segment to the one held up to the pipe, said means embodying an automatic latch device having a plurality of latching steps and adapted to latch the segments around the pipe selectively in one of a plurality of pipe encircling positions.

12. In a pipe tongs adapted to take work of different diameters, the combination of a plurality of relatively movable pipe encircling segments, means acting by virtue of contact with the pipe to hold one of the segments up to a pipe, and means acting automatically on closure of the segments about the pipe to latch another segment to the one held up to the pipe, said means embodying a spring actuated latch member on one of said segments and a lug member on the other, one of said members having a plurality of latch shoulders spaced in a direction circumferentially of the pipe encircling segments and the lug and latch members being conformed so that the latch member rides over the lug member as the segments are closed on the pipe.

13. In a pipe tongs adapted to take work of different diameters, the combination of a handle, a plurality of relatively movable parts pivoted to the handle and adapted to encircle the work, a latching device having a plurality of spaced latching steps and adapted to latch said parts selectively in position to engage pipes of different diameters, said parts being so connected with the handle that swinging movement of the handle with relation to said parts causes them to be constricted or opened, stop means acting to limit the movement of the handle in a direction to open said parts, the opening or loosening of said parts upon the pipe by movement of the handle being thus limited to an amount less than the distance between the adjacent steps of the latching device.

14. In a pipe tongs of the character described, the combination of a handle, pipe gripping jaws pivotally connected to the handle and arranged in a pivotally interconnected series in which an inner jaw is pivotally connected to the handle, and an outer jaw is pivotally connected to the inner jaw, a work contacting member carried by said outer jaw and having a projection extending inwardly adjacent the inner jaw and adapted to be moved into the jaw enclosed space when the jaws are opened, individual bushings for each of the jaws detachably mounted thereon, the bushings for the inner jaw being mounted directly on said jaw and the bushing for said outer jaw being carried by said pipe contacting member.

15. In a pipe tongs adapted to take work of different diameters, the combination of a handle, two inner pipe encircling segments pivoted to the handle, two outer pipe encircling segments pivoted each to one of the inner segments, a latching device having a plurality of spaced latching steps and adapted to latch the outer segments selectively in position to engage pipe of different diameters, the inner segments being so connected with the handle that swinging movement of the handle with relation to the segments causes the segments to be constricted or opened, means mounted on one of the outer segments and movable into the bore of the tongs by an opening movement of said outer segment and adapted to be engaged by the pipe to close and hold said outer segment upon the pipe, and stop means acting to limit the movement of the handle in a direction to open the inner segments, the opening of said inner segments upon the pipe by movement of the handle being thus limited to an amount less than the distance between adjacent steps of the latching device.

ELIHU C. WILSON.